June 5, 1962

G. STADE 3,037,420

POSITIONING, ADJUSTING OR MEASURING DEVICE FOR MACHINES

Filed April 19, 1961

Inventor:
Gerhard Stade
by
ATTORNEY

June 5, 1962 G. STADE 3,037,420
POSITIONING, ADJUSTING OR MEASURING DEVICE FOR MACHINES
Filed April 19, 1961 4 Sheets-Sheet 2
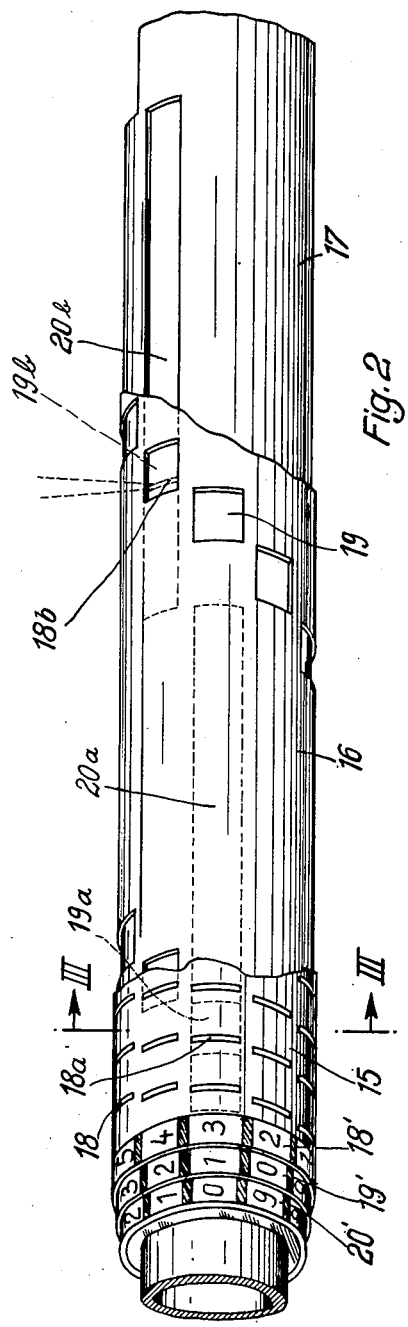
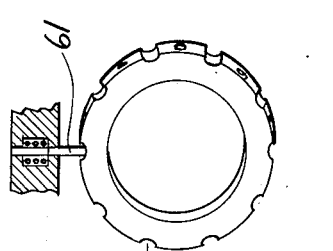
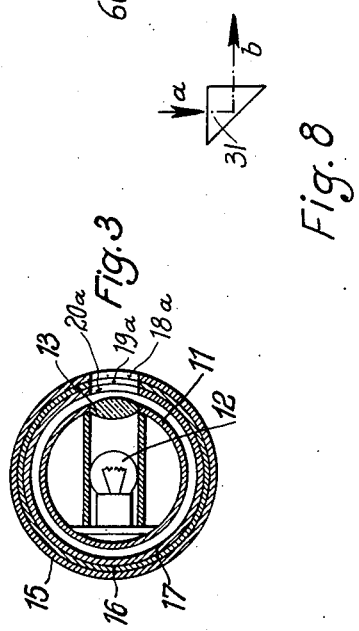
Inventor:
Gerhard Stade
ATTORNEY

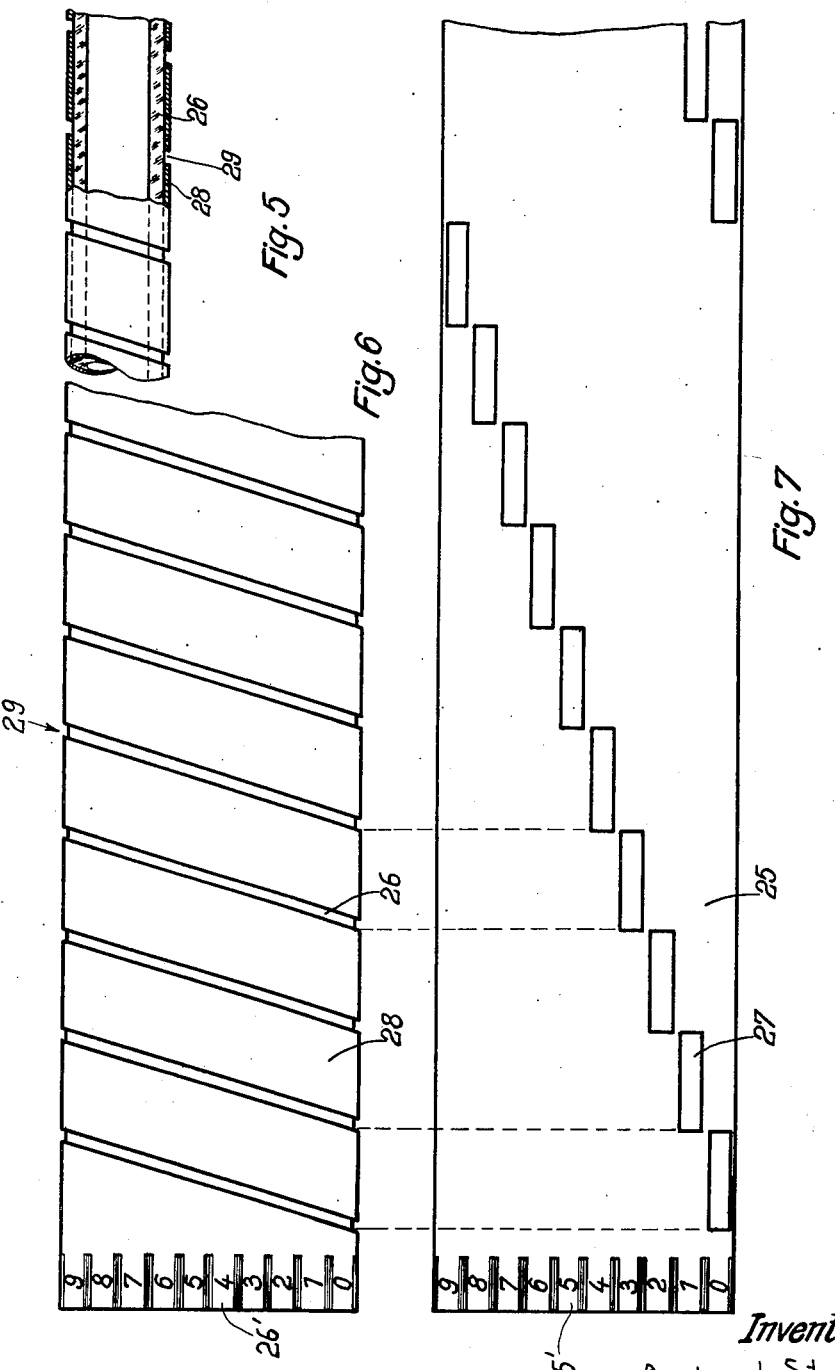

3,037,420
POSITIONING, ADJUSTING OR MEASURING DEVICE FOR MACHINES

Gerhard Stade, Berlin, Germany, assignor to Herbert Lindner G.m.b.H., Berlin-Wittenau, Germany, a corporation of Germany
Filed Apr. 19, 1961, Ser. No. 104,116
7 Claims. (Cl. 88—14)

This application is a continuation-in-part of my copending application Serial No. 684,141 filed September 16, 1957, and since forfeited.

My invention relates to positioning, adjusting and measuring devices of high accuracy on machines and measuring apparatus especially for movable machine parts such as adjusting slides of machine tools, and more particularly to devices of said type in which the control mechanism is actuated by optical and photoelectric means. One such device disclosed in my Patent No. 2,987,953 comprises a stationary scale provided with measuring apertures and a plurality of controllable shutters cooperating therewith to select a predetermined measuring aperture to control the movement of the machine part. In said device a plurality of rotary bodies revolving about parallel axes is being used, said bodies being provided with radially extending shutters having openings arranged in the manner described in said application. The action of the photoelectric controlling means is based on the comparison of two photoelectric currents in an electric bridge circuit, the positioning or setting being affected when the current in the equalizing lead of the bridge circuit is zero.

It has appeared that precise automatically controllable slide settings, such as are required in precision machine tools such as jig drills, and which are on the order of magnitude of 0.003 to 0.001 millimeter, are not possible with the known devices.

Furthermore, it appeared difficult, if not outright impossible, to place in the space available in machine tools a plurality of said rotating bodies arranged one next to the other.

The object of my present invention is to avoid the said and many other disadvantages and to improve the positioning, adjusting and measuring device in such a manner that its installation in machine tools is easily possible and that a precise control is achievable within close limits required in precision machine tools.

According to my present invention a plurality of tubes rotatable one within the other and provided with shutter slots cooperate with an illuminating device arranged in the inside of the tubes in fixed position in relation to the shiftable tube system, the adjusting movement being controlled by means of light rays passing through slots coinciding in different planes, said light rays impinging upon photocells arranged in said planes, the translucent apertures of the precision scale lying in one of these planes.

As compared with formerly used measuring apertures, which, if the scale is divided into millimeters, have a breadth of about half a division, the breadth of the measuring aperture is significantly reduced according to my present invention, said breadth being on the order of the precision of measurement, so as to generate in any direction of the movement of the slide an impulse to stop the movement of the slide precisely for the desired particular setting. The breadth of the aperture of the precision scale amounts to about 5 microns.

The slots which release the light beam may be broader, for it is important only that the preselected measuring aperture be chosen out of the plurality of the apertures in the scale. The breadth of the shutter slots in the outer tube will correspond approximately to the division interval of the scale, i.e., they may be 1 mm. wide when the apertures of the scale are spaced 1 mm. apart.

The slots in the tubes which are rotatable one inside the other are machined into their periphery and over the length of each tube, each slot being offset from the other along a continuous spiral, the breadth and the spacing of the slots from one another increasing from tube to tube by one order of magnitude, as for example a power of ten, and the slots in each tube having a width substantially corresponding to the sum of the widths of the slots arranged on one turn of the helical line upon the preceding tube.

It is of advantage to provide said tubes with overhanging margins on one side thereof said margins being designed as numeral carriers and being provided with click settings, said numerals corresponding to the slots on the slots on the tubes when the same are brought into position, the pre-selected measuring aperture being readable from the set numerals. On the overhanging margins of the tubes gears may also be fastened which are operationally connected with a setting mechanism arranged at another place.

The aperture on the precision scale, which is released by the mutual rotation of the tubes is divided for the required fine adjustment into fractions of a millimeter by a second tube system similar to the first tube system, consisting of a plurality of slotted tubes rotatable one inside the other; the second tube system project, by means of a lens located in its axis, an enlarged image of the scale measuring aperture selected by the first tube system upon the slots of the second tube system, which are likewise enlarged to the scale of this image, for the purposes of further division of the scale.

An expedient design of this second tube system consists in making the tubes of transparent material, preferably of glass, with an opaque surface, the outer tube having an engraved aperture line running in a continuous spiral whose spacing from turn to turn is equal (in respect of the image scale of the lens) to a multiple, for example, ten-fold of the required accuracy of reading and/or adjustment.

The second tube system is to be considered as a fine scale which, however, does not extend over the entire length of the maximum displacement usable for the adjusting process; instead, its spiral aperture line is engraved only on such a length of the tube as corresponds to the breadth of the measuring interval whose image is enlarged in the image scale of the lens. The light ray passing through the measuring aperture of the precision scale is used to activate the photocell for stopping the adjusting movement only after said ray passes through the aperture line of the second tube system. However, such a shut-off impulse would not be sufficient for the shifting movement of a machine tool slide, because in this case the entire adjusting process would have to be performed in slow motion, which is undesirable in view of the often great length of the slide travel.

The device according to the invention, however, creates the possibility of arranging in the light-ray path of the uncovered slots of the first and of the second tube system photocells which respond separately to the light impulses produced when the scale enters into the preselected position, the first light impulse controlling the shutting off of the rapid traverse and the turning on of the slow motion, and the second light impulse controlling the halting of the slow motion. For this purpose two or more stationary illuminating devices are arranged at intervals in the first tube system and provided with optical means which direct the light beams upon coinciding areas of the slots, which develop in various planes on the periphery of the tube system.

For the production of a preliminary impulse preceding the actual shut-off impulse, a shutter with an aperture is arranged in front of the photocell in a light-plane which does not lie in the light ray path of the precision scale, the edges of the aperture which lie perpendicular to the direction of movement controlling a preliminary impulse in both directions of movement of the slide for the shutting off of the rapid traverse and the turning on of the slow motion. For this impulse generation there is a considerably greater light energy available than in the shutting-off action, so that the shutting off of the rapid traverse movement by turning on of the slow motion, even in the case of high slide adjustment speeds, takes place with a sudden shock; if desired additionally acting brakes can be actuated to brake the slide movement down to slow motion. In this manner very considerable protection is given to the speed change mechanism.

The electrical connections can be simplified according to the invention by permitting the two photoelectric controlling impulses which emanate from the photocells to work upon two relays with rest contacts arranged in parallel which open the circuits of the magnet which brings about the switch-over from rapid traverse to slow motion and of the direction magnet selected in each case for right-hand and left-hand movement, said circuits being maintained after activation by holding contacts.

The said and other objects of my invention will be more fully understood from the following specification when read with the accompanying drawing in which one embodiment thereof is illustrated.

In the drawing—

FIG. 2 shows a perspective view, partly in sections, of the group of tubes forming a part of my device;

FIG. 3 shows a cross-sectional view thereof along line III—III in FIG. 2;

FIG. 5 shows a front view, partly in section, of the outer tube of the second tube system used in my device, the helical light permeable aperture appearing thereupon being enlarged;

FIGS. 6 and 7 show developed projections of the outer and inner tube, respectively, of said second tube system;

FIG. 8 shows schematically the deviating prism arranged within said second tube system, and FIG. 9 shows a schematic fragmentary perspective view of locking means for said tubes.

Figure 1:
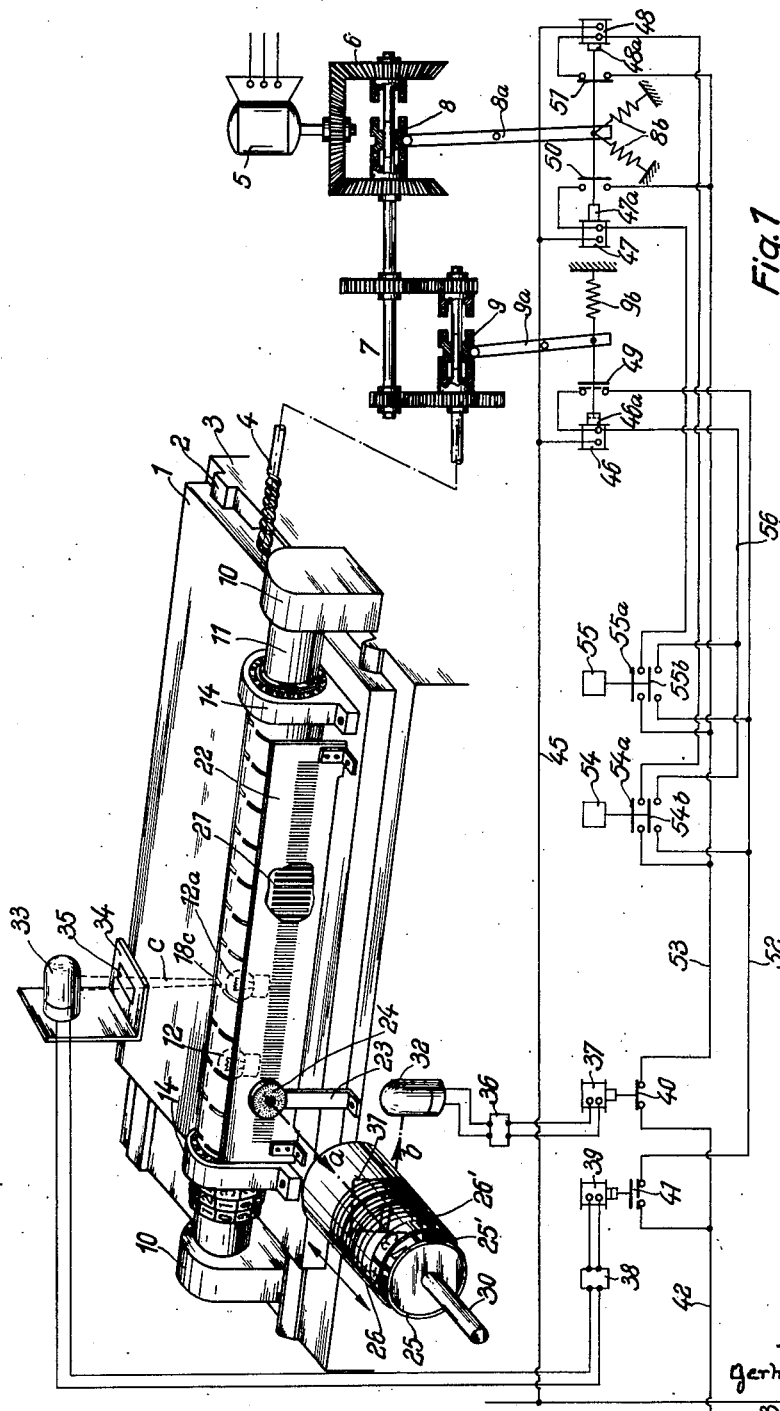
FIG. 1 shows a perspective view of my device installed on an adjusting slide and an electrical connection diagram applying thereto.

As shown in FIG. 1 the adjusting slide 1 such as the sliding carriage of a machine tool is carried on longitudinal guides 2 of the machine bed 3 and is traversed by a spindle 4 attached thereto said spindle being driven by an electric motor 5 over the reversing gear 6 and the speed change gear 7. Right and left hand operation is controlled by the clutch 8 of reversing gear 6 and the traverse by the clutch 9 of change gear 7.

Mounted upon the machine bed 3 are holders 10 supporting a stationary tube 11 which houses illuminating means such as the electric lamp 12 with coordinated lens 13 shown in FIG. 3. Mounts 14 mounted upon slide 1 support coaxially with said tube 11 the tubes 15, 16, 17 which are inserted one inside the other and individually rotatable for mutual adjustment (FIGS. 2 and 3).

Figure 4:
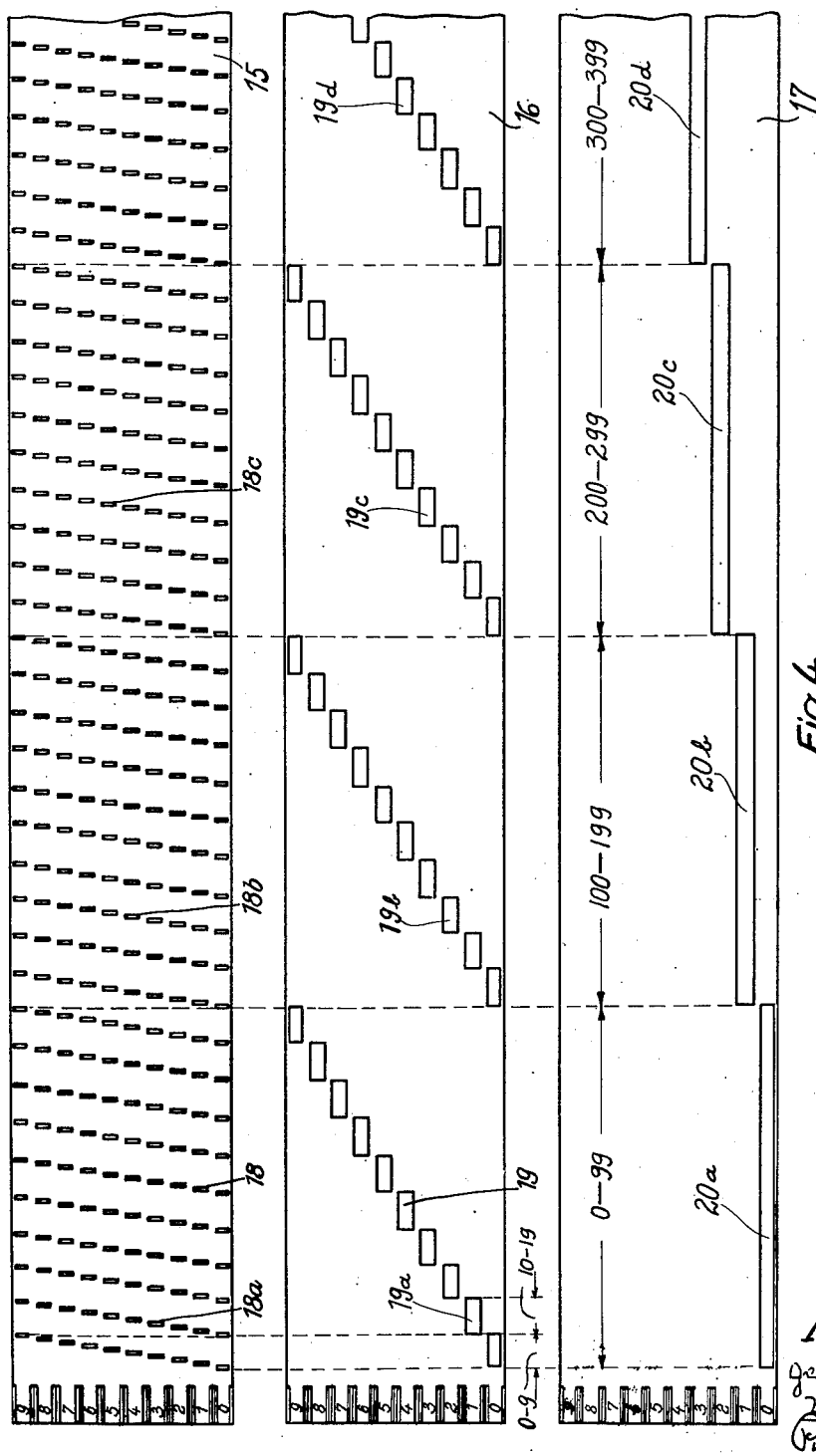
FIG. 4 shows a developed projection of said tubes.

As appearing from FIGS. 2 and 4 each of said rotatable tubes 15, 16, 17 is provided with a system, 18, 19, 20, respectively of substantially rectangular slots or openings which in each system offset against each other in axial direction of the tube along a continuous spiral, in a decimal measuring system, ten such slots being located in each full turn of the spiral. The outer tube 15 contains the system 18 of slots 18a, 18b, 18c, etc. of the ones division, the intermediate tube 16 contains the system 19 of slots 19a, 19b, 19c, etc. of the tens division, and the inner tube 17 contains the system 20 of slots 20a, 20b, 20c, etc. of the hundreds division. Accordingly each slot of system 18 corresponds to one measuring unit for example one millimeter, each slot of system 19 corresponds to the entirety of ten measuring units namely 0–9, 10–19, 20–29, etc. and each slot of system 20 corresponds to the entirety of one hundred measuring units namely 0–99, 100–199, 200–299, etc. The said spiral on tube 16 has a pitch ten times greater than the pitch of the spiral on tube 15 and the spiral on tube 17 has a pitch ten times greater than the pitch of the spiral on tube 16. Generally speaking the pitch of the spiral on each tube is so many times greater than the pitch of the spiral on the preceding (or following) tube as the number of slots located on one turn of the spiral of the preceding (or following) tube, the width of each slot on each tube being equal to the sum of the widths of the slots located on one turn of the spiral of the preceding (or following) tube (see FIG. 4). Thus the first one hundred slots 18a on tube 15 cooperate with the first ten slots 19a on tube 16 and with slot 20a on tube 17 permitting to set any number between 0 and 99; the second one hundred slots 18b cooperate with the second ten slots 19b on tube 16 and with slot 20b on tube 17; permitting to set any number between 100 and 199; and so on as illustrated in FIGS. 2, 3 and 4. Each mutual rotary setting of the tubes 15, 16, 17 will bring certain of their slots into coincidence with each other as described just before and with a preselected measuring aperture 21 (some of these apertures being shown in an enlarged view in FIG. 1) of a precision scale 22 mounted in front of said tubes upon the slide 1. In the shown embodiment the scale 22 is divided into millimeters and has the same length of one meter as each of said tubes 15, 16, 17. In the rotary setting illustrated in FIG. 2 the slots corresponding to the numerical value 013 overlap one another and thus the slot 18a of the first group is opened. In the following group the slot 18b corresponding to the numerical value 124 is being opened, in the next following group slot 18c corresponding to the numerical value 235, and so on. The decadal indexes 18', 19', 20' applying to each of the tubes 15, 16, 17 are located on the overhanging and overlapping margins at the left of said tubes, said margins snapping into the respective rotary setting. The said indexes may be substituted by toothed wheels operatively connected with an elsewhere located setting mechanism. Each of the tubes 15, 16, 17 may be secured in the set position by appropriate locking means for example as shown in FIG. 9. Each of the tubes 15, 16, 17 is provided with equally spaced depressions 60 into which engages a stationary spring-loaded pin 61.

A convergent lens 24 held in a post 23 mounted upon the machine bed 3 receives a light beam $a$ passing through the bared measuring slot 18a in the direction of arrow $a$ in FIG. 1. In the axis of said light beam is located a second tube system serving for further adjustment, said second tube system comprising an inner tube 25 and an outer tube 26 and being journaled upon the machine bed 3. Said tubes 25 and 26 as shown in FIGS. 1 and 5 are rotatably adjustable to each other. The slots of this second tube system, projected in an image enlarged to the image scale of lens 24, serve for the further subdivision of the measuring aperture. The second tube system as illustrated is adapted to subdivide the distance between apertures 21 of the scale 22 into one hundred divisional parts. The inner tube 25 (FIG. 7) has slots 27 which as the slots in tubes 15, 16, 17, are offset in accordance with the image scale in axial direction of the tube along a continuous spiral, ten slots being located on one turn of the spiral. The outer tube 26 (FIGS. 5 and 6) is made of a transparent material such as glass and is provided with an opaque surface layer 28 consisting for example of silver deposited by evaporation. In this layer 28 a helical aperture 29 is cut whose pitch from turn to turn, considering the image scale of lens 24, is equal to ten times the required accuracy of reading and/or adjusting. When the outer tube 26 is rotated one tenth of a full revolution, i.e. by 36°, the said helical aperture is moved one-hundredth of the scale division in respect of the image scale. The values corresponding to the setting to fractions of the scale division may be read from or preselected at the decadal indexes 25' and 26'.

Within the second tube system described above a stationary prism 31 is so mounted upon an axle 30 that the light beam *a* referred to above is reflected at a right angle in direction *b* as shown in FIGS. 1 and 8. This reflected light beam penetrates through the helical aperture 29 of tube 26, and impinges upon the photocell 32.

A light beam coming out of an open slot of another slot group of the first tube system 15, 16, 17 and emanating from a second stationary light source 12a arranged within tube 11 in spaced relation to the light source 12, runs in direction *c* avoiding the scale 22. As shown in FIG. 1 said beam in direction *c* does not come from slot 18b released during the rotary adjustment of tubes 15, 16, 17 in addition to slot 18a referred to above, but said beam comes from the released slot 18c in the third slot group. This light beam creates a photoelectric impulse in the photocell 33 and causes the slide 1 to change from rapid traverse to slow motion. Still other slots which are open in the actual rotary setting of the tubes may be used additionally in similar manner to initiate other desired operations or actions of or relating to the machine tool, for example illuminations, cooling, and others.

The light beam in direction *c* passes an opening 35 of a stationary shutter 34 before reaching and activating the photocell 33. This activation occurs before the slide 1 reaches the desired final setting as soon as said light beam is released from one or the other edge of said shutter 34.

FIG. 1 shows also the circuit diagram of a particularly simple and precisely operating circuit.

The photocell 32 works either directly or through amplifier 36 upon relay 37 and photocell 33 either directly or through amplifier 38 upon relay 39. Relay 37 is provided with a rest contact 40 and relay 39 with a rest contact 41, said contacts being connected in parallel through line wire 42 to line wire 43. The other line wire 44 is connected by conductor 45 to magnets 46, 47 and 48. Said line wires 43 and 44 lead to a not shown D.C. source or to a rectifier or an accumulator of for example 24 volts as customary in electrically controlled machine tools.

The armature 46a of magnet 46 works upon the control lever 9a of clutch 9 of the change gear 7. The armatures 47a and 48a of magnets 47 and 48 work upon the control lever 8a of clutch 8 of the reversing gear 6. The control lever 9a is checked by the restoring spring 9b and control lever 8a by the restoring springs 8b. Moreover, magnet 46 is provided with holding contact 49 and magnet 48 with holding contact 51, which are being closed by the drawing-in movement of the respective armatures. The holding contact 49 is connected through conductor 52 with rest contact 41. The parallel connected holding contacts 50 and 51 are connected by conductor 53 with rest contact 40. The push buttons 54 and 55 serve for running the rapid traverse or feed in a predetermined direction. For example, when button 54 is depressed the slide 1 runs to the right, or when button 55 is depressed, it runs to the left. Push buttons 54 and 55 have double contacts designated as 54a and 54b, and 55a and 55b, respectively. Contacts 54b and 55b are connected in parallel to conductor 52 and, when one of the said buttons is depressed, connect the magnets 46 in circuit through conductor 56. Since contact 41 is at first in the closed position indicated by the broken line, the circuit for magnets 46 remains closed, and clutch 9 is in the right position, not shown, in which the drive gears 7 work on spindle 4 for the traversing action. Contacts 54a and 55a are connected in parallel to conductor 53 and connect the latter to the direction magnets 48 and 47, respectively. As illustrated button 54 had been depressed for the choice of direction, so that, in addition to magnet 46, magnet 48 was actuated which holds itself as drawn, through its holding contact 51 and the closed rest contact 40.

The circuit is shown in FIG. 1 as being at the moment when the light beam *c* has already fallen upon cell 33, but cell 32 has not yet received any light. Thus relay 39 is energized and opens the rest contact 41, interrupting the holding current circuit for magnets 46, and clutch 9, being moved to the left as illustrated, switches the transmission gear for the slow motion. If cell 32 then receives light in the final position, relay 37 also opens its rest contact 40 interrupting the holding current circuit for magnet 48, so that clutch 8 passes to the middle position and interrupts the power train to spindle 4. At the same time, the slide 1 is expediently braked.

In order to start up again and bring the slide 1 into a newly preselected position, one of the buttons 54 and 55 must be depressed, whereupon the described process repeats.

While specific embodiments of my invention have been shown and described in detail to illustrate the application of the principles of my invention it will be well understood that the same may be otherwise embodied without departing from such principles and without avoiding the scope of the appended claims.

What I claim as my invention is:

1. In an adjusting, positioning, or measuring device for movable parts of machines and measuring apparatus the combination comprising a precision scale having translucent apertures; a first tube system composed of a plurality of tubes rotatably adjustable one within the other and displaceable relative to said scale; shutter slots in each of said tubes; the shutter slots in each tube being in staggered arrangement continuously displaced in axial direction of the tube substantially along a helical line; the slots in the outermost tube having substantially the width of said measuring apertures; the slots in each following tube having a width substantially corresponding to the sum of the widths of the slots arranged on one turn of the helical line upon the preceding tube; stationary illuminating means within the innermost tube; at least one photocell outside said tubes; said at least one photocell located to receive light rays from said illuminating means passing in different planes through temporarily coinciding slots of the rotatably adjustable tubes and through a predetermined translucent aperture of the precision scale; and controlling means for the movable machine part actuated by electric current controlled by said at least one photocell.

2. A device according to claim 1 comprising an overhanging margin on one side of each tube; locking means to hold the tubes in mutually adjusted positions; and numerical indications on said margins corresponding to the positioned slots of the tubes, said numerical indications denoting the preselected measurement aperture in the precision scale.

3. A device according to claim 2 comprising a gearing attached to the overhanging margins of the tubes, and a separately located adjusting mechanism operationally connected to said gearing.

4. A device according to claim 1 comprising a second tube system consisting of a plurality of tubes rotatably adjustable one within the other; slots in said tubes; a lens arranged in the axis of said second tube system and in front thereof; this tube system being stationary relative to the first tube system and to said precision scale; the lens projecting an enlarged image of said scale's measuring aperture selected by the first tube system upon the slots of the second tube system for further division of the measuring aperture.

5. A device according to claim 4 wherein the outer tube of the second tube system is of transparent material; an opaque surface on said tube; and a helical aperture on said opaque surface, its pitch from turn to turn, considering the image scale of the lens, being equal to a multiple of the required accuracy of reading and setting respectively.

6. A device according to claim 1 comprising at least one shutter including an opening, said shutter being arranged in any of the light rays containing measuring planes but the one passing through the measuring apertures of the precision scale and being located in front of one of the photocells; the edges of said opening lying crosswise to both directions of movement of the movable machine part and controlling a preliminary impulse for the shutting off of the rapid traverse and the change to slow movement.

7. A device according to claim 1 comprising two relays including parallel-connected rest contacts; said relays being responsive to the impulses emanating from said at least one photocell; said contacts controlling the electric current to actuate means operating the movable machine part and effecting the change from rapid traverse to slow motion, and reverse, and from one lateral movement to the other in either direction.

References Cited in the file of this patent

UNITED STATES PATENTS

| | | |
|---|---|---|
| 2,311,142 | Turrettini | Feb. 16, 1943 |
| 2,406,299 | Koulicovitch | Aug. 20, 1946 |
| 2,557,219 | Flint et al. | June 19, 1951 |
| 2,694,804 | Wagner | Nov. 16, 1954 |

FOREIGN PATENTS

| | | |
|---|---|---|
| 315,921 | Switzerland | Oct. 31, 1956 |
| 1,099,218 | France | Mar. 16, 1955 |